US006445819B1

(12) United States Patent
Kinjo

(10) Patent No.: US 6,445,819 B1
(45) Date of Patent: Sep. 3, 2002

(54) IMAGE PROCESSING METHOD, IMAGE PROCESSING DEVICE, AND RECORDING MEDIUM

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/393,577

(22) Filed: Sep. 10, 1999

(30) Foreign Application Priority Data

Sep. 10, 1998 (JP) .......................................... 10-257052

(51) Int. Cl.$^7$ .......................... G06K 9/34; G06K 9/48; G06K 9/46; H04N 1/387
(52) U.S. Cl. ...................... 382/173; 382/199; 382/203; 358/453
(58) Field of Search ................................ 382/164, 165, 382/171, 173, 176, 178, 185, 186, 187, 189, 199, 200, 203; 358/452, 453; 355/35; 400/304

(56) References Cited

U.S. PATENT DOCUMENTS

| 5,501,538 A | * | 3/1996 | Sawada et al. ............. 400/304 |
| 5,629,752 A | | 5/1997 | Kinjo ............................ 355/35 |
| 5,710,831 A | * | 1/1998 | Beernink et al. ........... 382/189 |
| 5,867,593 A | * | 2/1999 | Fukuda et al. .............. 382/176 |
| 5,881,171 A | | 3/1999 | Kinjo ........................ 382/199 |
| 5,907,631 A | * | 5/1999 | Saitoh ........................ 382/176 |
| 5,930,391 A | | 7/1999 | Kinjo ........................ 382/173 |
| 5,978,100 A | * | 11/1999 | Kinjo ........................ 358/453 |

FOREIGN PATENT DOCUMENTS

| JP | 52156624 | 12/1977 |
| JP | 53012330 | 2/1978 |
| JP | 53145620 | 12/1978 |
| JP | 53145621 | 12/1978 |
| JP | 53145622 | 12/1978 |
| JP | 4346333 | 12/1992 |
| JP | 8-183925 | 7/1996 |
| JP | A-8184925 | 7/1996 |
| JP | 9-138471 | 5/1997 |

OTHER PUBLICATIONS

Rowley et al, "Neural Network–Based Face Detection", Jan. 1998, IEEE Paper ISBN: 0162–8828, vol. 20, No. 1, pp. 23–38.*

* cited by examiner

Primary Examiner—Amelia M. Au
Assistant Examiner—Mehrdad Dastouri

(57) ABSTRACT

An image processing method, image processing device and recording medium are provided in which the effects of erroneous extraction of a region assumed to correspond to a main portion within an image are mitigated. On the basis of image data of an image which is an object of processing, plural face candidate regions, which are assumed to correspond to faces of persons, are extracted. A degree of overlapping is computed for a pair of overlapping face candidate regions. A weight point is set for each face candidate region such that a weight point of a face candidate region which overlaps with another face candidate region is higher than a weight point of a face candidate region which does not overlap with another face candidate region, and the higher the degree of overlapping with another face candidate region, the higher the weight point. By comparing weight points of face candidate regions with a threshold value, a face region corresponding to a face of a person is extracted from the respective face candidate regions. A weighted average value, in which density values of the respective face candidate regions are weighted in accordance with degrees of overlapping, is computed as a face region density.

10 Claims, 5 Drawing Sheets

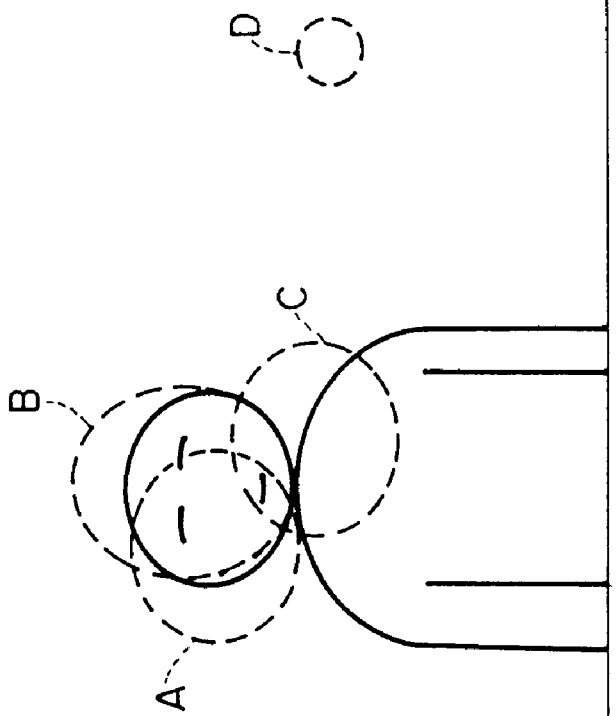

IMAGE PROCESSING METHOD, IMAGE PROCESSING DEVICE, AND RECORDING MEDIUM

BACKGROUND OF THE INVENTION

1. Field of the Invention

The present invention relates to an image processing method, an image processing device, and a recording medium, and in particular, to an image processing method for extracting a region which is assumed to be a region corresponding to a main portion in an image, to an image processing device to which the image processing method may be applied, and to a recording medium on which is recorded a program for executing the image processing method at a computer.

2. Description of the Related Art

When viewing a photograph of a person, the region to which the most attention is paid is the face of the person. For example, in a case in which an original image recorded on a photographic film is exposed and recorded (recorded by plane exposure or scanning exposure) onto a recording material such as a photographic printing paper, it is desirable to control the exposure such that the color and density of a person's face are appropriate. However, to realize such control of exposure, the color tint and the density of the region corresponding to the person's face in the original image must be accurately sensed. Further, among various image processings which have been developed in order to improve the image quality of an image expressed by image data obtained by the reading of the image, there are special image processings (such as correction of the density only at certain portions or red-eye correction or the like) which are carried out only on a region corresponding to a person's face within the image or only on a portion of such a region. In order to carry out such processings, the position and size of the region corresponding to a person's face within the image must be sensed accurately.

There have been proposed various conventional techniques for extracting a region assumed to correspond to a main portion such as a person's face within an image. For example, Japanese Patent Application Laid-Open (JP-A) No. 8-184925 discloses a face region extraction method in which, on the basis of image data, one configuration pattern of configuration patterns peculiar to portions of a person existing in an image (e.g., configuration patterns expressing the contour of a head portion, the contour of a face, the inner structure of a face, the contour of a torso, and the like) is searched for. In accordance with the size and orientation of a detected configuration pattern and the positional relationship between the face of a person and a predetermined portion of the person expressed by the detected configuration pattern, a region assumed to correspond to a person's face is set, other configuration patterns different from the detected configuration pattern are searched for, and a region (face region), which is within the set region and confirmed as being appropriate as a person's face and is assumed to correspond to a person's face, is extracted.

However, among the various techniques which have been proposed, none can always precisely extract a region corresponding to a main portion such as a person's face in an image, and there are cases when mistakes are made in extracting a region corresponding to a main region. When such mistakes are made, a drawback arises in that the results of image processing or exposure control carried out by using the results of extraction are inappropriate.

For example, in the case of an image in which a person is photographed by using a flash in a back-lit setting, if a high-brightness background portion within the image is erroneously extracted as a region corresponding to a person's face, when the amount of exposure at the time of exposing and recording the image onto a recording material is controlled on the basis of the color and the density of the extracted region, the recorded image will be of poor image quality as the region corresponding to the person's face will be colored-in black. Further, even in cases in which a special image processing is to be carried out only on the extracted region or a portion thereof, if the special processing is carried out only on a region which is different than a region which corresponds to a person's face within the image, the image quality of the image expressed by the image data deteriorates.

SUMMARY OF THE INVENTION

The present invention was developed in light of the aforementioned circumstances, and an object thereof is to provide an image processing method, an image processing device and a recording medium in which effects due to errors in extracting a region assumed to correspond to a main portion within an image can be mitigated.

The present inventors selected an arbitrary extraction method from among various extraction methods for extracting a region assumed to correspond to a main portion such as a person's face in an image. They repeatedly conducted experiments of extracting regions corresponding to main portions from a large number of images by using this selected extraction method, by varying the processing conditions of the extraction method (e.g., the threshold value for determining whether a region is a main portion) and by varying the extraction method itself. By comparing the regions extracted by these respective extractions, the present inventors discovered that, in most cases, the extracted regions which corresponded to or substantially corresponded to a main portion within the image overlapped other extracted regions and the degree of overlapping with other extracted regions was high. Thus, the present inventors hypothesized that the probability of an extracted region being a region corresponding to a main portion within an image is strongly correlated with the degree of overlapping with other extracted regions.

Among the various extraction methods, due to differences in the algorithms thereof, there are extraction methods in which there is no overlapping of extracted regions even in a case in which plural regions are extracted in a single extraction process, and there are extraction methods in which there is the possibility of overlapping of extracted regions occurring when plural regions are extracted in a single extraction process. (For example, in an algorithm which traces an edge in an image and extracts a region corresponding to a main portion, if edge tracing is carried out by using respectively different points as the starting points, different regions in which portions thereof overlap may be extracted as regions corresponding to main portions.) The present inventors confirmed that, even in the latter type of extraction methods, it is often the case that plural regions are extracted by a single extraction process, and extracted regions which overlap with another extracted region correspond or substantially correspond to a main region within the image, and, as mentioned above, the probability of an extracted region being a region corresponding to a main portion in an image is strongly correlated to the degree of overlapping with another extracted region.

On the basis of the above, the image processing method of the first aspect of the invention comprises the steps of: on the basis of image data, extracting candidate regions which are assumed to correspond to main portions in an image represented by the image data; determining, for each of candidate regions which overlap with another candidate region among the extracted candidate regions, a degree of overlapping with another candidate region; and for an extracted candidate region, evaluating the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases.

In the first aspect of the present invention, first, on the basis of the image data, a candidate region assumed to correspond to a main portion within the image expressed by the image data is extracted. The number of candidate regions to actually be extracted by this extraction depends on the contents of the image expressed by the image data, but in the present invention, it is desirable that plural candidate regions are extracted. Improving the probability of extracting plural candidate regions can be realized by, for example, extracting candidate regions plural times by using different extraction methods, or by extracting candidate regions plural times by using the same extraction method but by varying the processing conditions. Further, if an extraction method is used in which there is the possibility that there will be overlapping of each candidate region when plural candidate regions are extracted by one extraction processing, it suffices to carrying out extraction of the candidate regions a single time.

Among the extracted candidate regions, for those candidate regions which overlap with another candidate region in the image, a degree of overlapping with another candidate region is determined. The computation of the degree of overlapping can be carried out in a case in which, for example, plural candidate regions are extracted, and there exists a candidate region which overlaps with another candidate region.

As in the second aspect, for example, at least one of the following values may be used as the degree of overlapping: a value in which a distance between a pair of overlapping candidate regions (the distance between the respective centers of a pair of candidate regions, or the distance between representative points which represent positions of a pair of candidate regions) is normalized by using respective sizes of the pair of overlapping candidate regions as a standard; a value in which a surface area of an overlapped region of a pair of overlapping candidate regions is normalized by using respective sizes of the pair of candidate regions as a standard; and a value in which a size along a predetermined direction of an overlapped region of a pair of overlapping candidate regions is normalized by using as a standard respective sizes along the predetermined direction of the pair of overlapping candidate regions. Further, an average value or a weighted average value of two or more values among the respective values may be used. By using a value which is normalized in a manner such as described above, the degree of overlapping of the candidate region can be accurately digitized regardless of the sizes of the candidate regions. In a case in which the sizes of an overlapping pair of candidate regions are different, among the pair of values of the degrees of overlapping, which are both determined by using the sizes of the both candidate regions as a standard, it is preferable to use the value expressing the smaller degree of overlapping as the degree of overlapping.

In the first aspect, the probability that an extracted region is a region corresponding to a main portion within the image is evaluated in such a manner that, for a candidate region which overlaps with another candidate region, the evaluation of the probability of being a region corresponding to a main portion within the image is higher than the evaluation for a candidate region which does not overlap with another candidate region, and the evaluation becomes higher as the degree of overlapping with another candidate region increases. In this way, among the extracted candidate regions, candidate regions which are confirmed by the above described experiments as having a high probability of being a region corresponding to a main portion within the image, i.e., candidate regions which overlap with another candidate region and which have a relatively high degree of overlapping with another candidate region, have a higher evaluation of the probability of being a region corresponding to a main portion within the image than do other candidate regions.

The evaluation of an extracted candidate region can be carried out by, for example, setting an evaluation value which expresses by a number the evaluated level. The setting of the evaluation values may be carried out, for example, such that candidate regions which do not overlap with other candidate regions receive zero or a low value as their evaluation value, pairs of overlapping candidate regions receive evaluation values which increase as the degree of overlapping increases, and candidate regions which overlap with plural candidate regions receive an evaluation value which is the sum total of their evaluation values set in accordance with the degrees of overlapping with the respective overlapping candidate regions.

Examples of post-processings which use the results of the evaluation, for an extracted candidate region, of the probability of being a region corresponding to a main portion in an image include a processing for selecting from the respective candidate regions a candidate region having a high probability of being a region corresponding to a main portion as in the third aspect, or a processing for weighting the extracted candidate region (or candidate region selected from the extracted candidate regions) as in the fourth aspect. Even if, among the extracted candidate regions, candidate regions which are actually not main portions in the image are included due to mistakes in the extraction of regions assumed to be main portions in the image, by carrying out the evaluation relating to the first aspect, the effects caused by a candidate region which is not a main portion can be reduced in the post-processings on the basis of the results of evaluation.

For example, if a candidate region having a high probability of being a region corresponding to a main portion is to be selected, by selecting from the extracted candidate regions only those candidate regions whose evaluation of the probability as a region corresponding to a main portion is high, the candidate regions which are actually not main portions can be excluded. Further, for example, if weighting of the extracted candidate regions is carried out, the effects of the candidate regions which are actually not main portions can be mitigated by applying a large weight to a candidate region whose evaluation of the probability of being a region corresponding to a main portion is high and by applying a small weight to a candidate region whose evaluation of the probability of being a region corresponding to a main portion is low.

In this way, in accordance with the first aspect of the present invention, for an extracted candidate region, the probability of being a region corresponding to a main portion is evaluated on the basis of the existence of overlapping with other candidate regions and the degree of overlapping. Thus, on the basis of the results of evaluation, effects caused by erroneous extraction of regions assumed to correspond to main portions in an image can be reduced.

If a processing for selecting, from the extracted candidate regions, a candidate region having a high probability of being a region corresponding to a main portion is carried out as a post-processing by using the results of evaluation for an extracted candidate region, as in the third aspect, it is preferable to select from the extracted candidate regions a candidate region having a high probability of being a region corresponding to a main portion, by comparing an evaluation value, for the extracted candidate region, expressing the results of evaluation of the probability of being a region corresponding to main region, with a threshold value. In this way, even if candidate regions which actually are not main portions are included among the extracted candidate regions, such candidate regions can be eliminated on the basis of their evaluation values. Candidate regions having a high probability of being a region corresponding to a main portion can be accurately selected by an easy processing, and the standard for selection of the candidate region can be corrected by changing the threshold value.

As in the fourth aspect, the post-processing utilizing the results of evaluation for an extracted candidate region may be a processing for computing, as an image characteristic amount of the main portion, a weighted average of image characteristic amounts of extracted candidate regions or selected candidate regions, by weighting an extracted candidate region or a candidate region selected from the extracted candidate regions in accordance with the evaluation value expressing the results of evaluation of the probability of being a region corresponding to a main portion. In this way, even in a case in which a candidate region which is actually not a main portion is included among the extracted candidate regions, the weight for such a candidate region can be lowered on the basis of the evaluation value, and the image characteristic amount of the main portion can be accurately determined by a simple processing. In the fourth aspect, the selection of the candidate regions when candidate regions selected from the extracted candidate regions are used may be carried out in the same way as in the third aspect.

Various types of processings can be contemplated for the post-processings which are carried out after the evaluation, for an extracted candidate region, of the probability of being a region corresponding to a main portion. However, in a case in which a candidate region is extracted erroneously or a candidate region is mis-evaluated, the extent of the effect on the results of the post-processing differs greatly in accordance with the type of post-processing. Therefore, in the fifth aspect of the present invention, in the first aspect, after evaluation, for an extracted candidate region, of the probability of being a region corresponding to a main portion, when carrying out, on the basis of the results of evaluation, a predetermined image processing which includes at least one of selecting a candidate region having a high probability of being a region corresponding to a main portion and weighting an extracted candidate region, the standard for evaluation is changed or the standard for the selection or the weighting is change in accordance with the type of the predetermined image processing.

In accordance with the fifth aspect, for example, in a case in which the predetermined image processing is an image processing whose results of processing are greatly affected when a candidate region is erroneously extracted or a candidate region is mis-evaluated, for example, as in the sixth aspect, one of the following can be carried out: the standard of evaluation of the probability of being a region corresponding to a main portion is changed so as to be made more strict; the standard for the selection is changed such that only a candidate region evaluated as having a high probability of being a region corresponding to a main portion is selected; and a standard for weighting is changed such that a weight for a candidate region evaluated as having a low probability of being a region corresponding to a main portion is relatively small. In this way, in the post-processings, even though there is the possibility that some of the candidate regions corresponding to main portions will not be selected from the extracted candidate regions or that there will be drawbacks such as the weights therefor being too small, the results of processing of the predetermined processing can be prevented from being overly affected even when a candidate region is erroneously extracted or a candidate region is mis-evaluated.

For example, in a case in which the predetermined image processing is an image processing whose processing results are not greatly affected even if a candidate region is erroneously extracted or a candidate region is mis-evaluated, for example, as in the seventh aspect, one of the following can be carried out: the standard of evaluation of the probability of being a region corresponding to a main portion is changed so as to be made less strict; the standard for the selection is changed such that a candidate region evaluated as having a low probability of being a region corresponding to a main portion is also selected; and a standard for weighting is changed such that a weight for a candidate region evaluated as having a low probability of being a region corresponding to a main portion is relatively large. If a candidate region is erroneously extracted or a candidate region is mis-evaluated, in the post-processings, there is the possibility that candidate regions which are actually not main portions will be selected or that the weights therefor will be too large. However, the effects on the results of processing of the post-processing can be diminished. On the other hand, proper processing conditions can be obtained because there is a high possibility that all of the candidate regions corresponding to main portions among the extracted candidate regions will be selected and that large weights will be applied to candidate regions corresponding to main portions.

In this way, in accordance with the fifth aspect, when a predetermined image processing is carried out after the evaluation, for an extracted candidate region, of the probability of being a region corresponding to a main portion, the standard for evaluation is changed or the standard for selection or weighting is changed in accordance with the type of the predetermined image processing. Thus, appropriate processing results can always be obtained regardless of the type of the predetermined image processing.

For example, when an image in which a person is photographed in a backlit setting is recorded onto a recording material, if a high-brightness background portion within the image is erroneously judged to be a region corresponding to a main portion (a person's face in this case) and the recording density is controlled on the basis of the density of this region, the quality of the recorded image will be extremely low. Further, for example, when an image whose background portions are low-brightness is recorded onto a recording material, if the low-brightness background portion is erroneously judged to be a region corresponding to a main portion (the face of a person photographed in a backlit setting without the use of a flash, or the like) and the recording density is controlled on the basis of the density of this region, the quality of the recorded image will be a extremely low in this case as well.

Thus, in the eighth aspect of the present invention, in the first aspect, for a candidate region whose density within the candidate region is higher than a first predetermined value or lower than a second predetermined value, the evaluation of the probability of being a region corresponding to a main portion is lowered, or the standard for selection at the time a candidate region having a high probability of being a region corresponding to a main portion is selected is made higher.

In the eighth aspect of the present invention, for candidate regions whose density within the candidate region is higher than a first predetermined value or lower than a second predetermined value, i.e., for candidate regions whose density within the candidate region is either extremely high or extremely low, the evaluation of the probability of being a region corresponding to a main portion is lowered, or the standard for selection at the time of selecting a candidate region having a high probability of being a region corresponding to a main portion is raised. Thus, when the evaluation of the probability of being a region corresponding to a main portion is lowered, a region, whose density is either extremely high or extremely low and which is erroneously extracted as a candidate region, can be prevented, in the post-processings, from being selected as a candidate region having a high probability of being a region corresponding to a main portion and from having a large weight applied thereto.

If a processing, which includes selecting a candidate region having a high probability of being a region corresponding to a main portion, is carried out as the post-processing, by raising the standard for selection of a candidate region having a high probability of being a region corresponding to a main portion, a region whose density is either extremely high or extremely low and which is erroneously extracted as a candidate region can be prevented from being selected as a candidate region having a high probability of being a region corresponding to a main portion. Accordingly, even in a case in which a region whose density is extremely low or extremely high is erroneously extracted as a candidate region, the processing results of the post-processings are not inappropriate.

An image processing device of the ninth aspect of the present invention comprises: extracting means for, on the basis of image data, extracting candidate regions which are assumed to correspond to main portions in an image represented by the image data; computing means for determining, for each of candidate regions which overlap with another candidate region among the extracted candidate regions, a degree of overlapping with another candidate region; and evaluating means for evaluating, for an extracted candidate region, the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases. Thus, in the same way as in the first aspect, effects due to mistakes in the extraction of regions assumed to correspond to main portions within an image can be reduced.

A tenth aspect of the present invention is a recording medium on which is stored a program for executing at a computer a processing comprising: a first step of, on the basis of image data, extracting candidate regions which are assumed to correspond to main portions in an image represented by the image data; a second step of determining, for each of candidate regions which overlap with another candidate region among the extracted candidate regions, a degree of overlapping with another candidate region; and a third step of, for an extracted candidate region, evaluating the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases.

In the recording medium of the tenth aspect is recorded a program for implementing at a computer a processing including the aforementioned first through third steps, i.e., a processing relating to the image processing method of the first aspect of the present invention. Thus, by a computer reading and executing the program recorded on the recording medium, in the same way as in the first aspect, effects due to mistaken extraction of a region assumed to correspond to a main portion within an image can be reduced.

BRIEF DESCRIPTION OF THE DRAWINGS

FIG. 3 is an image diagram showing an example of processing results of face candidate region extraction processing.

DESCRIPTION OF THE PREFERRED EMBODIMENTS

Figure 1:
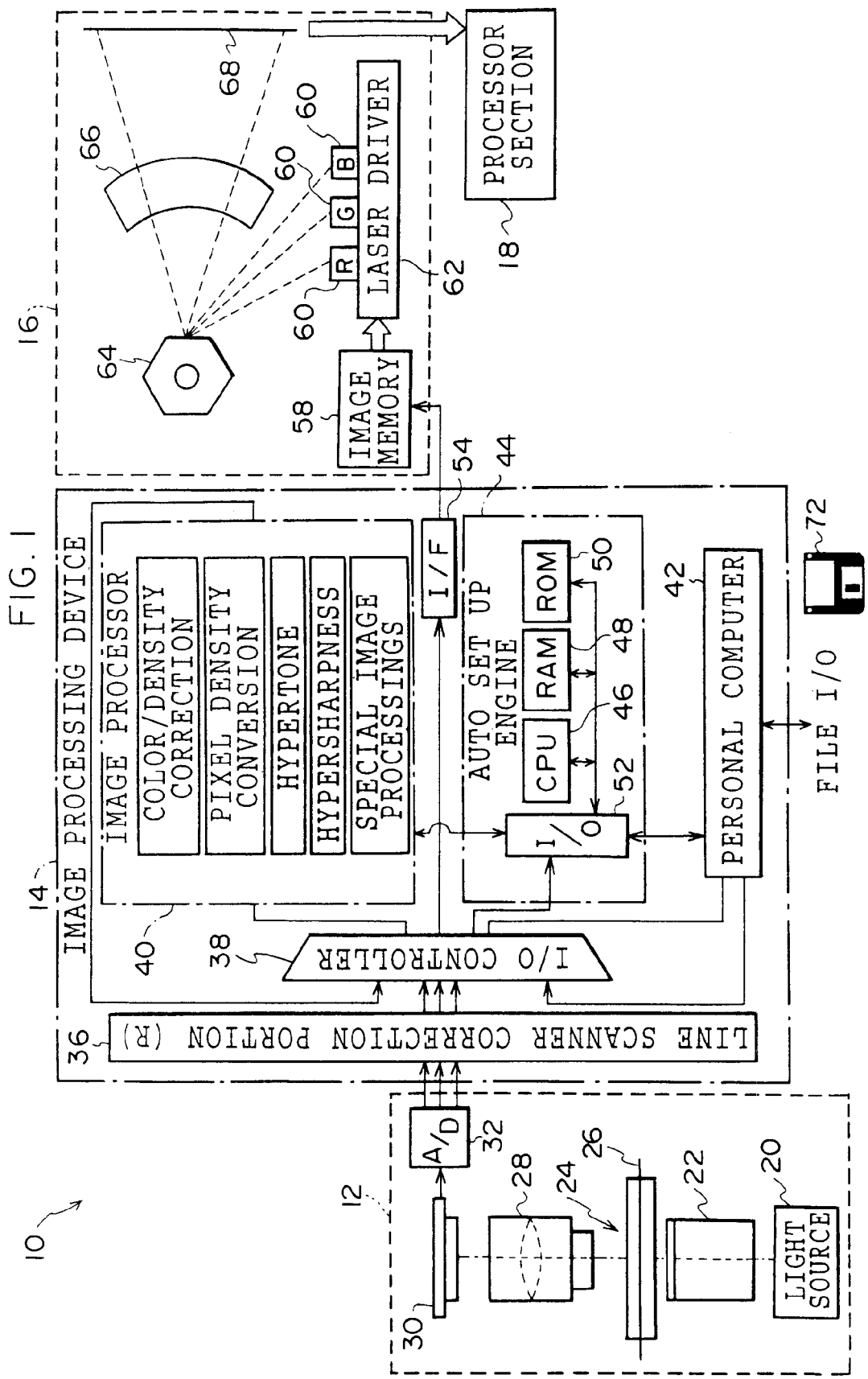
FIG. 1 is a schematic structural view of an image processing system relating to an embodiment of the present invention.

Hereinafter, an embodiment of the present invention will be described in detail with reference to the drawings. FIG. 1 illustrates an image processing system 10 to which the present invention is applied. The image processing system 10 is formed by a scanner 12, an image processing device 14 and a printer 16 which are connected in series.

The scanner 12 reads a film image (a negative image or a positive image which, after photographing of an object, is made visible due to developing processing) recorded on a photographic photosensitive material (hereinafter referred to as "photographic film") which is, for example, a photographic film (e.g., a negative film or a reversal film). The scanner 12 outputs the image data obtained by this reading. Light, which is emitted from a light source 20 and whose unevenness in the light amount has been reduced due to a light diffusing box 22, is illuminated onto a photographic film 26, such as a negative film or a reversal film, set at a film carrier 24. The light transmitted through the photographic film 26 is focused onto the light-receiving surface of a CCD sensor 30 (either an area sensor or a line sensor may be used) via a lens 28.

The film carrier 24 conveys the photographic film 26 such that the places on the photographic film 26 at which film images are recorded are positioned successively on the optical axis of the light emitted from the light source 20. In this way, the film images recorded on the photographic film 26 are read in order by the CCD sensor 30, and signals corresponding to the film images are outputted from the CCD sensor 30. The signals outputted from the CCD sensor 30 are converted into digital image data by an A/D converter 32, and are inputted to the image processing device 14.

A line scanner correction section 36 of the image processing device 14 carries out the following processings in order: darkness correction for subtracting the dark output levels of the cells corresponding to the respective pixels from the inputted scan data (the R, G, B data inputted from the scanner 12); density conversion for logarithmically converting the data subjected to darkness correction into data expressing density values; shading correction for correcting the density-converted data in accordance with unevenness in the light amount of the light illuminated onto the photographic film 26; and defective pixel correction for, among the data subjected to shading correction, interpolating, from data of the surrounding pixels, data of a cell for which no signal corresponding to the incident light amount has been outputted (hereinafter, a "defective pixel"), and generating new data. The output terminals of the line scanner correction section 36 are connected to input terminals of an I/O controller 38. The data which has been subjected to the aforementioned processings at the line scanner correction section 36 are inputted to the I/O controller 38 as scan data.

An input terminal of the I/O controller 38 is connected to a data output terminal of an image processor 40 such that image data, which has been subjected to image processings (which will be described in detail later), is inputted from the image processor 40. Further, an input terminal of the I/O controller 38 is connected to a personal computer 42. The personal computer 42 has an expansion slot (not illustrated). Drivers (not shown) for carrying out data reading and writing from and onto information storage media such as memory cards, CD-Rs, and the like, and communications control devices for carrying out communications with other information processing equipment are connected to this expansion slot. When file image data is inputted from the exterior via the expansion slot, the inputted file image data is inputted to the I/O controller 38.

Output terminals of the I/O controller 38 are connected to a data input terminal of the image processor 40, and to an auto set up engine 44 and the personal computer 42. Further, an output terminal of the I/O controller 38 is connected to a printer 16 via an I/F circuit 54. The I/O controller 38 selectively outputs inputted image data to the aforementioned respective equipment connected to the output terminals of the I/O controller 38.

In the present embodiment, the scanner 12 reads film images, which are recorded on the photographic film 26, twice, each time at a different resolution. In the first reading which is carried out at a relatively low resolution (hereinafter, "prescanning"), even when the density of the film image is extremely low (e.g., an underexposed negative image on a negative film), the entire surface of the photographic film 26 is read under reading conditions (the light amounts of the respective R, G, B wavelength regions of the light illuminated onto the photographic film 26, the charge accumulating time of the CCD sensor 30) which have been determined such that there is no saturation of the charge accumulated in the CCD sensor 30. The data obtained by this prescanning (prescan data) is inputted to the auto set up engine 44 from the I/O controller 38.

The auto set up engine 44 is equipped with a CPU 46, a RAM 48 (e.g., a DRAM), a ROM 50 (e.g., a ROM whose stored contents are rewritable), and an input/output port 52, which are connected together via a bus. On the basis of the prescan data inputted from the I/O controller 38, the auto set up engine 44 determines the frame position of the film image, and extracts data (prescan image data) corresponding to the film image recorded region on the photographic film 26. Further, on the basis of the prescan image data, the auto set up engine 44 determines the size of the film image, computes an image characteristic amount such as density, and determines reading conditions for re-reading of the prescanned photographic film 26 at a relatively high resolution (hereinafter called "fine scanning"). Then, the auto set up engine 44 outputs the frame position and the reading conditions to the scanner 12.

On the basis of the prescan image data, the auto set up engine 44 carries out computation of an image characteristic amount including the extraction of a main portion within the film image (e.g., a region corresponding to a person's face (a face region)). The auto set up engine 44 automatically determines, by computation, the processing conditions of the respective image processings for the image data (fine scan image data) obtained by the scanner 12 conducting the fine scanning (this determination of the processing conditions is called "set up computation"), and outputs the determined processing conditions to the image processor 40.

A display, a keyboard, and a mouse (all unillustrated) are connected to the personal computer 42. The personal computer 42 fetches the prescan image data from the auto set up engine 44, and fetches the processing conditions for the image processings determined by the auto set up engine 44. On the basis of the fetched processing conditions, the personal computer 42 subjects the prescan image data to image processings which are equivalent to image processings to be carried out by the image processor 40 on the fine scan image data, and generates simulation image data.

The generated simulation image data is converted into a signal for displaying the image on the display, and on the basis of this signal, a simulation image is displayed on the display. Further, an operator verifies the image quality and the like of the displayed simulation image. When information instructing correction of the processing conditions is inputted via the keyboard as the results of the verification, this information is outputted to the auto set up engine 44. In this way, at the auto set up engine 44, processings such as re-computation of the processing conditions of the image processings are carried out.

The image data (fine scan image data), which is inputted to the I/O controller 38 by the film image being fine scanned by the scanner 12, is inputted to the image processor 40 from the I/O controller 38. The image processor 40 is equipped with image processing circuits for carrying out various types of image processings such as color/density correcting processing including gradation conversion and color conversion; pixel density conversion processing; hypertone processing for compressing the gradation of the super-low frequency brightness components of the image; hypersharpness processing for enhancing the sharpness while suppressing graininess; and the like. The inputted image data are subjected to the various image processings in accordance with the processing conditions determined and notified for each image by the auto set up engine 44.

In addition to the image processings described above, examples of other image processings which can be carried out at the image processor 40 are the following: sharpness correction or soft focus processing for the entire image or a portion thereof (e.g., the region corresponding to a person's face); image processing for purposely changing the image tone (image processing for finishing the output image in monotone, image processing for finishing the output image in a portrait finish, image processing for finishing the output image in a sepia tone, or the like); image processing for editing the image (e.g., image processing to provide a slender-look finish in the actual image for a person existing in the original image, image processing for correcting red-eye, and the like); LF aberration correction processing for correcting geometric distortion and color offset caused by distortion aberration and chromatic aberration of magnification of an LF lens for images photographed by using an LF (lens-fitted film package); peripheral reduced-light correction processing for correcting a reduction in light at the peripheral portions of the image which is due to the peripheral light reduction of an LF lens; various types of LF aberration correction processings for correcting a reduction in image quality of an output image due to characteristics of an LF lens, such as out-of-focus correction processing for correcting a reduction in sharpness of an image caused by characteristics of the LF lens; and the like.

When image data which has been subjected to image processings at the image processor 40 is used to record an image onto photographic printing paper, the image data subjected to image processings at the image processor 40 is outputted from the I/O controller 38 via the I/F circuit 54 to the printer 16 as image data for recording. Further, in a case in which the image-processed image data is to be output to the exterior as an image file, the image data is outputted from the I/O controller 38 to the personal computer 42. In this way, at the personal computer 42, the image data inputted from the I/O controller 38 for output to the exterior is outputted to the exterior (the aforementioned driver or communications control device or the like) as an image file via the expansion slot.

The printer 16 is equipped with an image memory 58, R, G, B laser light sources 60, and a laser driver 62 which controls the operation of the laser light sources 60. The image data for recording which has been inputted from the image processing device 14 is temporarily stored in the image memory 58, and thereafter, is read, and is used to modulate the R, G, B laser light emitted from the laser light sources 60. The laser light emitted from the laser light sources 60 is scanned onto a photographic printing paper 68 via a polygon mirror 64 and an f$\theta$ lens 66, such that an image is exposed and recorded on the photographic printing paper 68. The photographic printing paper 68 on which the image has been exposed and recorded is sent to a processor section 18 and is subjected to various processings such as color developing, bleaching fixing, washing and drying. In this way, the image which has been exposed and recorded on the photographic printing paper 68 is made visible.

Next, as operation of the present embodiment, explanation will be given of face region extraction/density computation processing which is carried out after prescan data has been inputted from the scanner 12 to the image processing device 14, and at the auto set up engine 44, processings, such as cutting-out of the image data from the prescan data, have been carried out.

This face region extraction/density computation processing is processing to which the image processing method relating to the present invention is applied, and is realized by a face region extraction/density correction program being executed by the CPU 46 of the auto set up engine 44. The face region extraction/density correction program is originally stored in an information storage medium 72 (see FIG. 1) together with programs for implementing other processings at the CPU 46. In FIG. 1, the information storage medium 72 is illustrated as a floppy disk, but may be a CD-ROM or a memory card or the like. The information storage medium 72 is loaded into an information reading device (not shown) connected to the personal computer 42. When installation of the program into the image processing device 14 from the information storage medium 72 is instructed, the information reading device reads the face region extraction/density correction program and the like from the information storage medium 72, and stores the face region extraction/density correction program and the like onto a ROM 50 whose stored contents are rewritable.

When the time for executing the face region extraction/density correction processing has arrived, the face region extraction/density correction program is read from the ROM 50 and is executed by the CPU 46. In this way, the auto set up engine 44 functions as the image processing device of the present invention. The information storage medium 72 on which the face region extraction/density correction program is stored corresponds to the recording medium of the eighth aspect of the present invention.

Figure 2:
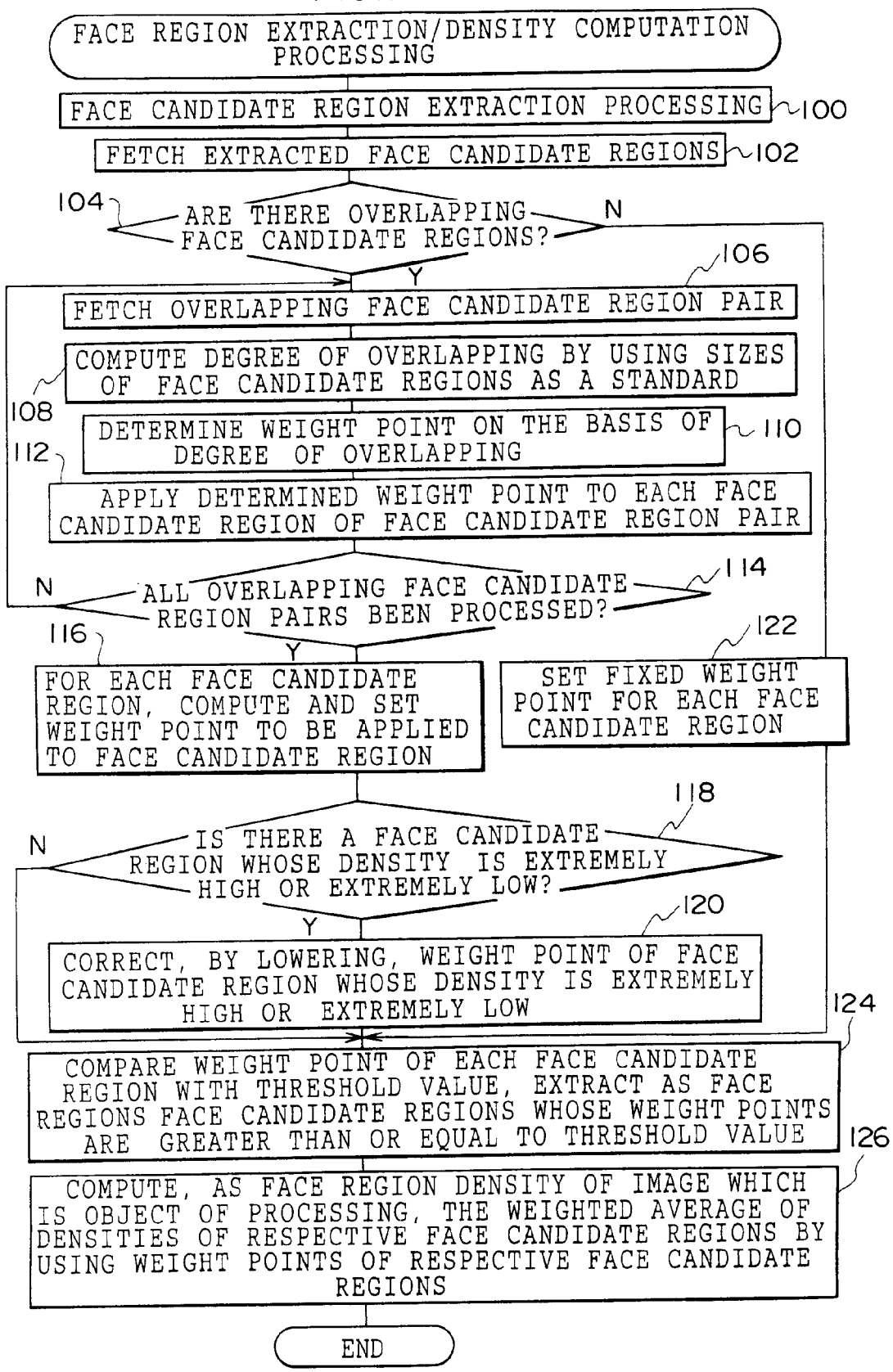
FIG. 2 is a flowchart showing the contents of face region extraction/density computation processing relating to the embodiment.

Hereinafter, the face region extraction/density correction processing will be described with reference to the flowchart in FIG. 2. In step 100, on the basis of the image data which is the object of processing, face candidate region extraction processing is carried out for extracting, as a main portion in the image expressed by the image data, a region (face candidate region) which is assumed to correspond to the face of a person in the image. The following are examples of types of the extraction method to be used to carry out the face candidate region extraction processing: a face candidate region extraction method in which a region assumed to correspond to a face of a person within the image is determined, and this region is extracted as a face candidate region; and a background portion eliminating method in which a region (background region) assumed to correspond to the background within the image is determined, and a region other than the background region is extracted as a face candidate region. More specifically, face candidate region extraction processing can be carried out by using at least one of the following conventional face candidate region extraction methods and background eliminating methods.

Face Candidate Region Extraction Method Example 1

An image is divided into a large number of measurement points and data (image data) is obtained by dividing each measurement point into the three colors of R, G, B. On the basis of this image data, a determination is made, for each measurement point, as to whether the measurement point is included within a flesh-colored range on a color coordinate. A region in which there exists a cluster (group) of measurement points determined to be within a flesh-colored range is extracted as a face candidate region. (Refer to JP-A-52-156624, JP-A-52-156625, JP-A-53-12330, JP-A-53-145620, JP-53-145621, JP-A-53-145622.)

Face Candidate Region Extraction Method Example 2

On the basis of the aforementioned image data, a histogram for hue values (and saturation values) is prepared, and the prepared histogram is divided into mountains. For each of the measurement points, a determination is made as to which of the divisional mountains the measurement point belongs. The measurement points are divided into groups corresponding to the divisional mountains, and the image in each group is divided into plural regions. From among the plural regions, a region is assumed to correspond to a person's face, and the assumed region is extracted as a face candidate region (see JP-A-4-346333).

Face Candidate Region Extraction Method Example 3

On the basis of the aforementioned image data, one configuration pattern of configuration patterns specific to portions of a person existing in the image (e.g., configuration patterns expressing the contour of a head portion, the contour of a face, the internal structure of a face, the contour of a torso, and the like) is searched for. In accordance with the size and orientation of a detected configuration pattern and the positional relationship between the face of a person and a predetermined portion of the person expressed by the detected configuration pattern, a region assumed to correspond to a person's face is set. Further, other configuration patterns different from the detected configuration pattern are searched for, and a face candidate region, which is within the set region and is confirmed as being appropriate as a person's face, is extracted. (Refer to JP-A-8-122944, JP-A-8-184925, JP-A-9-138471.)

Background Portion Eliminating Method Example 1

On the basis of the aforementioned image data, for each measurement point, a determination is made as to whether the measurement point is included within a range of a specific color on a color coordinate which clearly belongs to background (e.g., the blue of the sky or the sea, the green of grass or trees). Regions in which there exist clusters (groups) of measurement points judged to be within the above specific color ranges are judged to be background regions and are eliminated. The remaining regions are extracted as non-background regions (regions for which there is a high probability that a region corresponding to a person's face is included therein; these are also the face candidate regions of the present invention).

Background Portion Eliminating Method Example 2

In the same way as the above-described main portion extraction method example 2, on the basis of the aforementioned image data, an image is divided into a plurality of regions. Thereafter, for each region, a characteristic amount of a region corresponding to a background is determined (the ratio of straight-line segments included in a contour, line symmetry, number of protruding portions and recessed portions, degree of contact with the outer edge of the image, density contrast within the region, the existence or lack thereof of a density change pattern within the region, and the like). On the basis of the determined characteristic amount, for each region, a determination is made as to whether the region is a background region. The regions determined to be background portions are eliminated, and the remaining regions are extracted as non-background regions (face candidate regions). (Refer to JP-A-8-122944, JP-A-8-184925.)

The above-described extraction methods are merely examples. Any method may be used provided that it is an extraction method which extracts a region assumed to correspond to a person's face from an image. Further, in step 100, plural extraction methods may be used, and face candidate region extraction processing may be carried out plural times. Or, a single extraction method may be used and face candidate region extraction processing may be carried out plural times by varying the processing conditions each time.

As an example, as shown in FIG. 3, a plurality of face candidate regions (face candidate regions A through D in FIG. 3) are extracted from the image, which is the object of processing, by the face candidate region extraction processing in step 100. Step 100 corresponds to the extracting means in the ninth aspect of the present invention. The processings which are carried out hereafter are processings carried out on the face candidate region which has been extracted by the face candidate region extraction processing. However, the extracted face candidate region itself may be used as the object of processing, or a region of a fixed configuration (e.g., a circular region or a square region) which circumscribes the extracted face candidate region may be used as the object of processing.

In step 102, all of the face candidate regions extracted by the face candidate region extraction processing in step 100 are fetched. In step 104, a determination is made as to whether, among the fetched face candidate regions, there are face candidate regions which overlap each other in the image (as an example, refer to the face candidate regions A, B, C in FIG. 3). If the answer to this determination is affirmative, the routine proceeds to step 106 where a single pair of overlapping face candidate regions (in the above example, face candidate regions A, B, or face candidate regions A, C, or face candidate regions B, C) is fetched as the object of processing. In subsequent step 108, by using the sizes of the fetched face candidate region pair as a reference, the degree of overlapping x of the face candidate regions is computed. Step 108, together with the previous step 106, correspond to the computing means of the ninth aspect of the present invention.

Figure 4A:
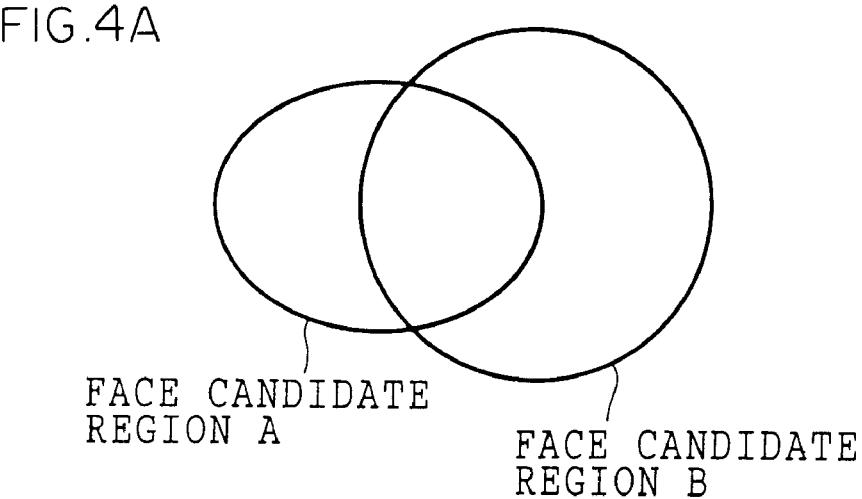
FIG. 4A is an image diagram showing an example of a pair of overlapping face candidate regions.

For example, in FIG. 4A, the face candidate region A and the face candidate region B overlap one another. Given that the surface area of the face candidate region A is $S_A$, the surface area of the face candidate region B is $S_B$, and the surface area of the overlapping region is $S_{AB}$, the degree of overlapping x can be computed, for example, in accordance with following formula (1).

$$x = \min(S_{AB}/S_A, S_{AB}/S_B) \qquad (1)$$

In formula (1), the min ( ) is an operator expressing that the minimum value of the values within the parentheses is to be selected. $S_{AB}/S_A$ is a value in which the surface area $S_{AB}$ of the overlapping region is normalized on the basis of the surface area $S_A$ of the face candidate region A. $S_{AB}/S_B$ is a value in which the surface area $S_{AB}$ of the overlapping region is normalized on the basis of the surface area $S_B$ of the face candidate region B. Thus, in formula (1), the value which is the smallest of values in which the surface area of the overlapping region is normalized on the basis of the respective sizes (surface areas) of the overlapping face candidate region pair A, B is the degree of overlapping x. In this way, by using a value, in which the surface area of the overlapping region is normalized on the basis of the surface area of a face candidate region, as the degree of overlapping x, the degree of overlapping can be accurately digitized regardless of the sizes of the face candidate regions.

In formula (1), as the degree of overlapping increases (i.e., as the value of the surface area $S_{AB}$ increases) the values defined by $S_{AB}/S_A$, $S_{AB}/S_B$ increase. Thus, in formula (1), the value which is the smallest among the both values (the value expressing the smaller degree of overlapping) is used as the degree of overlapping x. In this way, for example, even in cases in which one of the face candidate regions is included within another face candidate region, the value of the degree of overlapping x can be prevented from becoming extremely large.

Further, given that the distance between the central position of the face candidate region A and the central position of the face candidate region B is $L_{AB}$, the degree of overlapping x may be computed in accordance with following formula (2) or formula (3).

$$x = \max(L_{AB}/\sqrt{(S_A)}, L_{AB}/\sqrt{(S_B)}) \quad (2)$$

$$x = \max(L_{AB}^2/S_A, L_{AB}^2/S_B) \quad (3)$$

In formulas (2) and (3), the max ( ) is an operator expressing that the maximum value of the values within the parentheses is to be selected. $L_{AB}/\sqrt{(S_A)}$ and $L_{AB}^2/S_A$ are values in which the distance $L_{AB}$ between centers is normalized on the basis of the surface area $S_A$ of the face candidate region A. $L_{AB}/\sqrt{(S_B)}$ and $L_{AB}^2/S_B$ are values in which the distance $L_{AB}$ between centers is normalized on the basis of the surface area $S_B$ of the face candidate region B. Thus, in formulas (2) and (3), the value, which is the largest of the values in which the distance between the centers is normalized on the basis of the sizes (surface areas) of the overlapping face candidate region pair A, B, is used as the degree of overlapping x. In this way, by using a value, in which the distance between the centers is normalized on the basis of the surface area of a face candidate region, as the degree of overlapping x, the degree of overlapping can be accurately digitized regardless of the sizes of the face candidate regions.

In formulas (2) and (3), as the degree of overlapping increases (i.e., as the value of the distance $L_{AB}$ between the centers decreases), the values defined by $L_{AB}/\sqrt{(S_A)}$, $L_{AB}/\sqrt{(S_B)}$ or by $L_{AB}^2/S_A$, $L_{AB}^2/S_B$ become smaller. Thus, the value which is the largest of the two values in formula (2) and in formula (3) (the value expressing the smaller degree of overlapping) is used as the degree of overlapping x. In this way, for example, in a case in which one of the face candidate regions is included in another face candidate region, the value of the degree of overlapping x can be prevented from becoming extremely small.

In formulas (2) and (3), the "distance between the candidate regions" may be the distance between the centers of a pair of face candidate regions. However, the present invention is not limited to the same. The "distance between the candidate regions" may be a distance between representative points which represent respective positions of the pair of face candidate regions, and the degree of overlapping x may be determined by using a value in which this distance is normalized. The following are examples of a representative point: a point which corresponds to the center of a figure of a predetermined configuration which is circumscribed around or in the face candidate region (e.g., an N-sided figure (N≧3) or a circular figure (a perfect circle or an oval)); and a point which is determined by a specific method of computation set in advance.

The following are examples of points which are determined by a specific method of computation set in advance: a specific vertex of an N-sided figure shaped region (e.g., a rectangular region) circumscribed around the face candidate region; a point corresponding to the center of gravity of plural vertices of such an N-sided figure shaped region; a point corresponding to a position which is spaced apart, from an upper side end portion (the upper side in the vertical direction of the face) along a longitudinal axial direction of an oval-shaped region circumscribed around a face region, by a length corresponding to X % of the length of the oval shaped region along the longitudinal axial direction thereof; and the like.

Given that the length of the face candidate region A along a predetermined direction (e.g., the direction of the long side of the image or the direction along the short side of the image) is $L_A$, the length of the face candidate region B along the predetermined direction is $L_B$, and the length of the overlapping region along the predetermined direction is $L_{AB'}$, the degree of overlapping x may be computed in accordance with the following formula (4).

$$x = \min(L_{AB'}/L_A, L_{AB'}/L_B) \quad (4)$$

In this way, by using a value, in which the length of the overlapping region along a predetermined direction is normalized on the basis of the length of a face candidate region along the predetermined direction, as the degree of overlapping x, the degree of overlapping can be accurately digitized regardless of the sizes of the face candidate regions.

The average value or the weighted average value of degrees of overlapping x determined by using two or more formulas from among formula (1), formula (2) (or formula (3)), and formula (4), may be used as the final degree of overlapping x. However, the direction of the change in the value with respect to the change in the degree of overlapping differ for, on the one hand, the degree of overlapping x determined by formula (2) or formula (3) and, on the other hand, the degree of overlapping x determined by formula (1) or formula (4). Thus, when calculating an average value or a weighted average value, the values must be converted to one type of value such that the directions of change in the values are the same.

In the calculation of the weighted average value, the weights to be applied to the degrees of overlapping determined by the above computation methods can be determined by carrying out advance face region extraction by using the degrees of overlapping determined by the above computation methods and evaluating each computation method as to the degree of matching with an actual face region. For example, the present inventors confirmed through experimentation that using a degree of overlapping obtained by formula (1) often resulted in a high degree of matching with an actual face region. If a weighted average of the degree of overlapping obtained by formula (1) and the degree of overlapping obtained by formula (2) (or formula (3)) is used as the degree of overlapping x, it is preferable that the weight applied to the degree of overlapping obtained from formula (1) is greater than the weight applied to the degree of overlapping obtained from formula (2) (or formula (3)).

Instead of using, as the degree of overlapping x, a weighted average of degrees of overlapping determined by respective computation methods, degrees of overlapping determined by respective computation methods may be converted into weight points P (to be described in detail later), and a weighted average value of the weight points P corresponding to respective methods of computation may be set as the final weight point.

In subsequent step 110, on the basis of the degree of overlapping x computed as described above, a weight point P, which is to be applied to each of the face candidate regions of the face candidate region pair which is the object of processing and which was fetched in step 106, is determined. If, in the previous step 108, a degree of overlapping x is computed which becomes larger as the degree of overlapping of the face candidate region increases, the determination of the weight point P may be carried out as follows: as shown as an example in FIG. 4B, the degree of overlapping x may be converted into a weight point P by using a map which is determined by a conversion characteristic such that, as the value of the degree of overlapping x increases, the weight point P increases. On the other hand, if, in the previous step 108, a degree of overlapping x is computed which becomes smaller as the degree of overlapping of the face candidate region increases, the determination of the weight point P may be carried out as follows: as shown as an example in FIG. 4C, the degree of overlapping x may be converted into a weight point P by using a map which is determined by a conversion characteristic such that, as the value of the degree of overlapping x increases, the weight point P decreases.

Figure 4B:
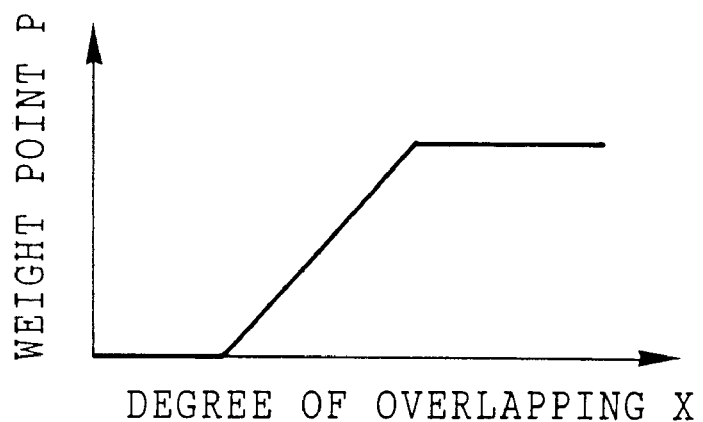
FIGS. 4B and 4C are graphs showing examples of maps for setting weight points in accordance with the degree of overlapping.
Figure 4C:
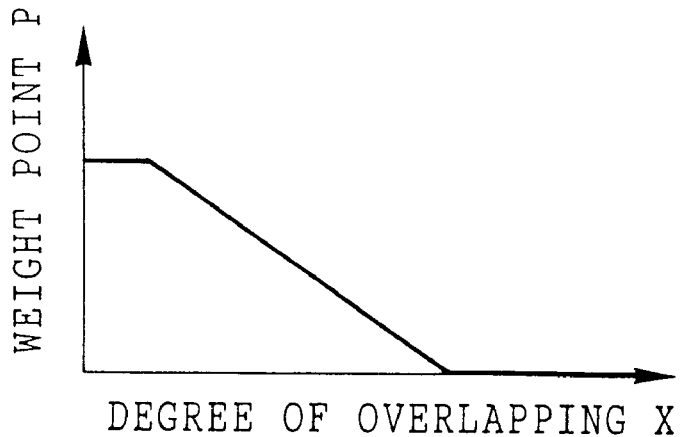

The conversion characteristics illustrated in FIGS. 4B and 4C are merely examples. For example, in the conversion characteristics illustrated in FIGS. 4B and 4C, there exists an insensitive region in which the weight point P does not vary with respect to changes in the degree of overlapping x. However, a conversion characteristic which does not have such an insensitive region may be used. Further, a conversion characteristic in which the weight point P changes non-linearly with respect to changes in the degree of overlapping x may be used. It suffices that a conversion characteristic in which the weight point P increases as the degree of overlapping increases or decreases monotonically is used.

When the weight point P is determined in this manner, the determined weight point P is applied to each face candidate region of the face candidate region pair which is the object of processing (step 112). In the subsequent step 114, a determination is made as to whether the processings in steps 106 through 112 have been carried out on all of the overlapping face candidate region pairs. If the answer to the determination is negative, the routine returns to step 106, and the processings of steps 106 through 112 are repeated for the other overlapping face candidate region pairs. In this way, weight points P are added to all of the overlapping face candidate region pairs.

When the answer to the determination in step 114 is affirmative, the routine moves to step 116 where, for each of the face candidate regions, the weight points P applied thereto are added up, and the sum total value is set as the weight point P for the face candidate region. For example, when the face candidate regions A through D shown in FIG. 3 are extracted from the image which is the object of processing, no weight point P is added to the initial value 0 for the face candidate region D because the face candidate region D does not overlap with any other face candidate regions (weight point $P_D 0=$). Each of the face candidate regions A through C overlaps with two face candidate regions. Thus, two weight points P are added up, and the added-up total is set as the final weight point for each of the face candidate regions A through C. Among these, the face candidate region C, which has the smallest degree of overlapping with other face candidate regions, is given the lowest weight point $P_C$. The face candidate region B, whose degree of overlapping with the face candidate region C is greater than that of the face candidate region A, is given the highest weight point $P_B$ (The face candidate region B is the face candidate region which has the highest degree of matching with the actual face region in FIG. 3.) The weight point P, which is set for each of the face candidate regions in above-described step 116, corresponds to an evaluation value which expresses an evaluation of the probability that the face candidate region is a region corresponding to a human face. Weight points P for face candidate regions overlapping with other face candidate regions are higher values than weight points P for face candidate regions which do not overlap with other face candidate regions. Further, the greater the degree of overlapping of a face candidate region with other face candidate regions, the higher the value of the weight point number. Step 116, together with steps 110 and 112, corresponds to the evaluating means of the ninth aspect of the present invention.

If, among the face candidate regions extracted in step 100, there are face candidate regions whose density is extremely high or extremely low and such face candidate regions are actually not face regions, there is a high possibility that the densities of these face candidate regions will adversely affect the processing results of post-processings which are carried out after the face regions are extracted. Therefore, in step 118, a determination is made as to whether, among the face candidate regions extracted in step 100, there are face candidate regions whose density M within the region is extremely high or extremely low.

The density M may be an average density (absolute value) within the region, or may be a relative density which is relative to the average density of the entire image surface of the image which is the object of processing. The above determination may be carried out by comparing the density M with a threshold value $TH_{HIGH}$, which is for judging whether the density M is an extremely high value, and with a threshold value $TH_{LOW}$, which is for judging whether the density M is an extremely low value. The threshold value $TH_{HIGH}$ corresponds to the first predetermined value in the eighth aspect, and the threshold value $TH_{LOW}$ corresponds to the second predetermined value in the eighth aspect.

In a case in which the densities M of all of the face candidate regions are less than the threshold value $TH_{HIGH}$ and are greater than the threshold value $TH_{LOW}$, it can be determined that there are no face candidate regions whose densities are extremely high or extremely low. Therefore, the determination in step 118 is negative, and the routine proceeds to step 124. On the other hand, in a case in which there exists a face candidate region whose density M satisfies either density M>threshold value $TH_{HIGH}$ or density M<threshold value $TH_{LOW}$, it can be judged that the density M of that face candidate region is extremely high or extremely low. Therefore, the determination in step 118 is affirmative, and the routine proceeds to step 120 where the weight point P of the face candidate region, whose density M has been judged to be either extremely high or extremely low, is corrected by being lowered. Thereafter, the routine moves on to step 124.

Figure 5A:
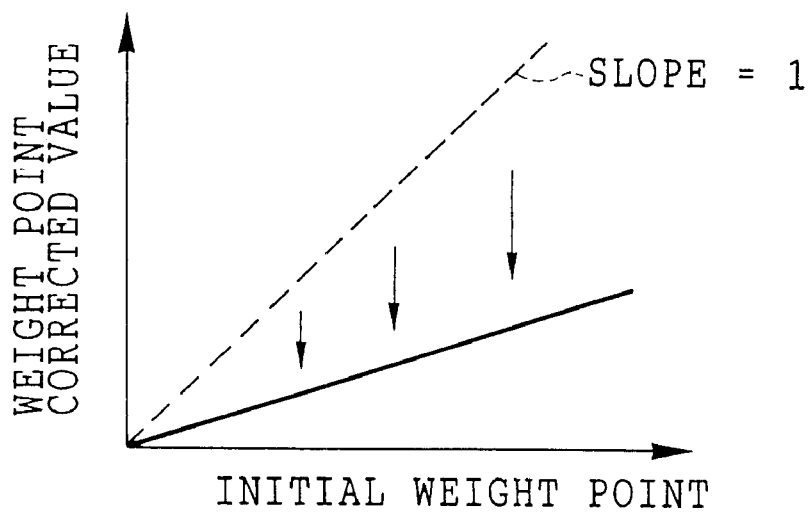
FIG. 5A is a graph showing a map for correcting the weight point for a face candidate region whose density is extremely high or extremely low.

The correction of the weight point P can be carried out by using, for example, the map shown in FIG. 5A. This map has a conversion characteristic expressed by a straight line, which passes through the origin and whose slope is 1, on a coordinate in which the initial (original) weight points are plotted against the horizontal axis and the corrected weight points are plotted against the vertical axis. By converting (correcting by lowering) the weight points P by using such a map, even in a case in which a face candidate region whose density M is extremely high or extremely low is actually not a face region, the extent of adverse effects that this face candidate region has on the post-processings can be reduced. Steps 118 and 120 correspond to the eighth aspect of the present invention.

In a case in which there are no face candidate regions which overlap each other on the image among the face candidate regions extracted in step 100, the determination in step 104 is negative. The routine proceeds to step 122 where a given value is set as the weight points P of the respective face candidate regions, and the routine moves on to step 124. In step 124, the weight point P of each face candidate region is compared with a threshold value $TH_F$ for face region judgment, and those face candidate regions whose weight points P are greater than or equal to the threshold value $TH_F$ are extracted (selected) as face regions. If the determination in step 104 is affirmative (i.e., if there are face candidate regions which overlap each other), because weight points are high for face candidate regions which overlap with other face candidate regions and whose degree of overlapping is high, the face candidate regions having high probabilities of being face regions are extracted as face regions. Step 124 corresponds to the third aspect of the present invention.

In subsequent step 126, the face region density Mface of the image which is the object of processing is computed in accordance with following formula (5) or (6), and the face region extraction/density computation processing ends.

$$Mface = \sum_{i=1}^{N} (M_i \cdot P_i) / \sum_{i=1}^{N} P_i \qquad (5)$$

$$Mface = \sum_{i=1}^{N} (M_i \cdot P_i \cdot S_i) / \sum_{i=1}^{N} (P_i \cdot S_i) \qquad (6)$$

In the formulas, i is a numeral for identifying each of the face candidate regions, N is the total number of face candidate regions, $M_i$ is the density of the face candidate region i, $P_i$ is the weight point of the face candidate region i, and $S_i$ is the surface area of the face candidate region i.

As is clear from formulas (5) and (6), the face region density Mface is a weighted average of the densities M of the respective face candidate regions. In formula (5), the respective face candidate regions are weighted on the basis of the weight points P thereof. In formula (6), the respective face candidate regions are weighted on the basis of the weight points P and the surface areas S. If the determination in step 104 is affirmative (i.e., if there are overlapping face candidate regions), because weight points are high for face candidate regions which overlap with other face candidate regions and whose degree of overlapping is high, the face region density Mface is a value which is closer to the density of an actual face region than the average value of the densities M of the respective face candidate regions.

It is known from experience that face candidate regions having a relatively small surface area have a relatively low probability of being a face region. In formula (5), the face region density Mface is computed without taking into consideration the surface areas of the respective face candidate regions. Thus, if there is included, among the face candidate regions which are the objects of computation of the face region density Mface, a face candidate region whose surface area is relatively small and which is actually not a face region, the density M of that face candidate region greatly affects the face region density Mface. Thus, when the face region density Mface is computed by using formula (5) (or formula (6)), for example, a face candidate region, whose surface area S is a predetermined value or less or whose surface area S is relatively small as compared to the other face candidate regions, is excluded from being an object of computation of the face region density Mface, or the face region density Mface is computed with the value of the weight point P for that face candidate region being made small. In this way, the effect that the density M of a face candidate region, whose surface area is relatively small and which actually is not a face region, has on the face region density Mface can be mitigated.

Further, in formula (6), the face region density Mface is computed in a manner in which the weights of the face candidate regions, whose surface areas S are large, are relatively high. Therefore, if there is included, among the face candidate regions which are the objects of computation of the face region density Mface, a face candidate region whose surface area is relatively large and which is actually not a face region, the density M of that face candidate region greatly affects the face region density Mface. Thus, when the face region density Mface is computed by using formula (6), for example, an upper limit value $S_{max}$ is set for the values of the surface areas S, and for a face candidate region whose value of the surface area S is greater than the upper limit value $S_{max}$, the value of the surface area S may be substituted by the upper limit value $S_{max}$ (clipping), or the value of the weight point P for that face candidate region may be made small. In this way, the effect, on the face region density Mface, of the density M of a face candidate region whose surface area is relatively large and which actually is not a face region can be mitigated. Further, this reducing of the value of the weight point P of a face candidate region whose value of the surface area S is greater than the upper limit value $S_{max}$ can also be applied to a case in which the face region density Mface is computed by using formula (5).

Step 126 corresponds to the fourth aspect of the invention. The face region density Mface corresponds to the image characteristic amount of the main portion in the fourth aspect. However, the image characteristic amount of the main portion is not limited to the density, and any of various known image characteristic amounts may be used.

When the above-described face region extraction/density computation processing is carried out, the auto set up engine 44 again computes processing conditions for the respective image processings to be carried out at the image processor 40. However, the results of processing of the face region extraction/density computation processing are used in the computation of the processing conditions of only some of the image processings. For example, the face region extracted in step 124 is used in the computation of image processings carried out at the image processor 40 on the face region or only a portion thereof (e.g., sharpness correction or red-eye correction on the face region). The processing conditions are set such that the image processing is carried out only on the face region. Further, the face region density Mface computed in step 126 is used, for example, for image processing (e.g., color/density correction) carried out at the image processor 40 on the entire image. For example, processing conditions such as density correction conditions may be computed such that the face region density Mface becomes a predetermined density.

As described above, the extraction of the face region and the computation of the face region density Mface are carried out by using the weight points which are set on the basis of the degree of overlapping x. Therefore, even if, among the face candidate regions extracted by the face candidate region extraction processing, there are, due to erroneous extraction, face candidate regions which are actually not face regions, the probability that a face candidate region which is not actually a face region will be extracted as a face region is greatly decreased, and a great change in the face region density due to the density of a face candidate region which is actually not a face region can be prevented. Accordingly, appropriate processing conditions can be obtained even for image processings whose processing conditions are computed by using the results of extraction of the face regions or by using the face region density Mface. Appropriate processing results of image processings carried out at the image processor 40 on fine scan image data can also be obtained.

Figure 5B:
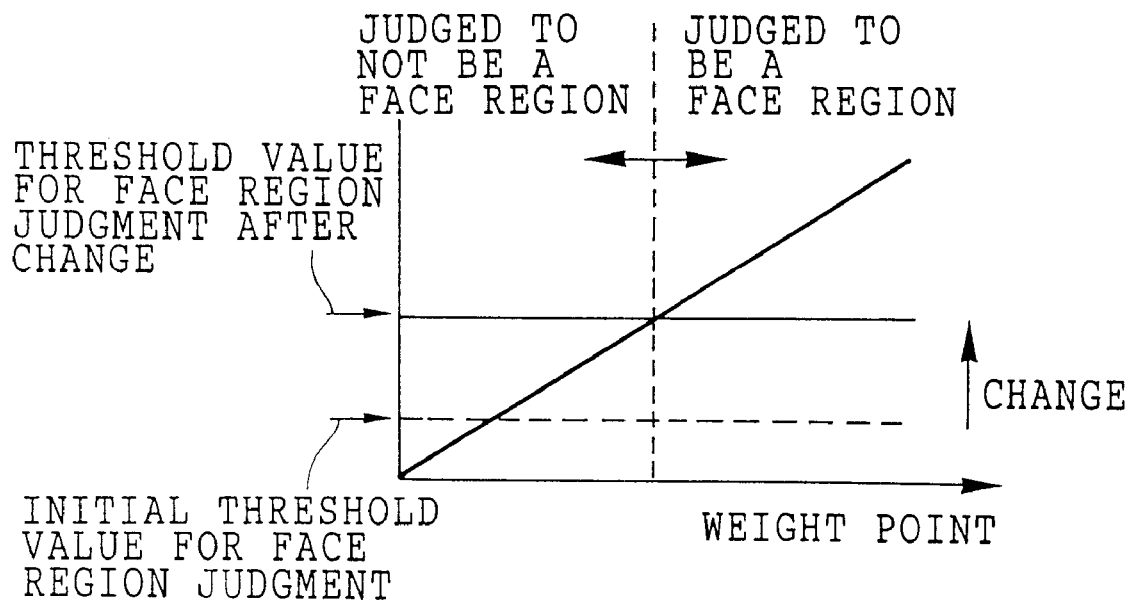
FIG. 5B is a graph for explaining the changing of a threshold value for face region judgment in a case in which there is a face candidate region whose density is extremely high or extremely low.

In the above description, for those face candidate regions whose densities are extremely high or extremely low, the weight points are corrected by being lowered. However, the present invention is not limited to the same. In a case in which a face region is extracted from face candidate regions, in the extraction of the face region, the threshold value $TH_F$ for face region judgment may be changed by, for example, being increased, as illustrated in FIG. 5B, for only those face candidate regions whose densities are extremely high or extremely low or for all of the face candidate regions. This corresponds to the "making the standard for selection higher" in the eighth aspect of the present invention. In this way, it can be made difficult to extract face candidate regions, whose densities are extremely high or extremely low, as face regions. The amount of change in the threshold value $TH_F$ may be a constant value. Or, the amount of change in the threshold value $TH_F$ may be varied in accordance with the differences between, on the one hand, the densities M of the face candidate regions judged to have densities which are extremely high or extremely low, and on the other hand, the threshold values $TH_{HIGH}$, $TH_{LOW}$ for judging whether the density M is extremely high or extremely low. Or, instead of the above structure, when the computed degree of overlapping x is converted to a weight point P, if the density M of at least one of the face candidate regions of the face candidate region pair which is the object of processing is extremely high or extremely low, it is possible to apply a weight point which is not overly high to the face candidate region pair which is the object of processing.

Further, the weight point P set for each of the face candidate regions, the threshold value $TH_F$ for face region judgment, or the weights applied to the densities M of the respective face candidate regions in the face region density Mface may be changed in accordance with the type of image processing to be carried out by using the processing results of the face region extraction/density computation processing. The processing which will be described hereinafter corresponds to the fifth aspect of the present invention.

For example, in the image processor 40, sharpness enhancing processing, for enhancing the sharpness of a face region by locally using an edge enhancing filter only at the extracted face region, may be carried out by using the results of extraction of the face region by the face region extraction/density computation processing. In this case, even if sharpness enhancement is carried out for regions which are actually not face regions, there are cases in which the adverse effect when the finished print is viewed is small (not conspicuous), although it depends on the degree of sharpness enhancement and the type of the filter as well. In this case, the value of the threshold value $TH_F$ for face region judgment may be made smaller than usual (i.e., the standard for the selection of the face candidate region may be changed), such that more face candidate regions are judged to be face regions. As the value of the threshold value $TH_F$ for face region judgment decreases, the probability that a face candidate region which actually corresponds to a face region will be mistakenly judged to not be a face region decreases. Thus, due to the above structure, sharpness enhancing processing can be carried out without missing any of the face regions in the image.

Further, instead of changing the value of the threshold value $TH_F$ for face region judgment, by setting the weight point P to be a greater value than usual for a degree of overlapping x determined by computation (i.e., by changing the standard for evaluation for each of the face candidate regions), more face candidate regions can be judged to be face regions. In particular, when processing in which the degree of sharpness enhancement is increased as the weight point P increases is carried out as the sharpness enhancing processing, the degree of sharpness enhancement can be controlled to be greater by setting the weight point P as described above.

Further, for example, density correction processing, for locally correcting the density for only the extracted face region on the basis of the face region density Mface, may be carried out by using the face region density Mface and the results of extraction of the face region by the face region extraction/density computation processing. In this case, even if density correction is carried out for regions which are actually not face regions, there are cases in which the adverse effect when the finished print is viewed is small (not conspicuous), although it depends on the degree of density correction as well. In this case, the value of the threshold value $TH_F$ for face region judgment may be made smaller than usual, such that more face candidate regions are judged to be face regions. As the value of the threshold value $TH_F$ for face region judgment decreases, the probability that a face candidate region which corresponds to an actual face region will be mistakenly judged to not be a face region decreases. Thus, due to the above structure, density correction processing can be carried out without missing any of the face regions in the image.

Instead of changing the value of the threshold value $TH_F$ for face region judgment, by setting the weight point P to be a greater value than usual for a degree of overlapping x determined by computation, more face candidate regions can be judged to be face regions. In particular, when processing in which the degree of density correction is increased as the weight point P increases is carried out as the density correction processing, the degree of density correction can be controlled to be greater by setting the weight point P as described above.

The above description is of a case in which image processing is carried out wherein, in the face region extraction, even if a region which is actually not a face region is mistakenly extracted as a face region, the effects on the image processing are small. However, in the opposite case in which an image processing is carried out which is greatly effected by a case in which a region which is actually not a face region is mistakenly extracted as a face region, it is possible to extract as face regions only those face candidate regions whose probability of being a face region is high, by, for example, setting the value of the threshold value $TH_F$ for face region judgment to be higher than usual, or setting the value of the weight point P for the degree of enhancement x to be smaller than usual.

Further, as shown by following formula (7) for example, a weighted average value Mface' of the face region density Mface determined by formula (5) (or formula (6)) and another image characteristic amount D (e.g., the average density of the entire image, the average density of the non-face-candidate regions) may be computed as the face region density (wherein $\alpha_F$ is a weighting factor for the face region density Mface and $\alpha_O$ is a weighting factor for the image characteristic amount D). In this case, the weights applied to the densities M of the respective face candidate regions can be changed by changing the values of the weighting coefficients $\alpha_F$, $\alpha_O$ in accordance with the type of image processing which is to be carried out by using the computed face region density (i.e., by changing relatively the standards for weighting the respective face candidate regions).

$$M\text{face}' = \alpha_F \cdot M\text{face} + \alpha_O \cdot D \qquad (7)$$

Further, plural types of image processings having respectively different requirements with respect to the processing results of the face region extraction/density computation processing may be carried out as the image processings carried out by using the processing results of the face region extraction/density computation processing (e.g., an image processing in which it is desirable to not have regions which are not actually face regions included among the extracted face regions, an image processing in which it is desirable to have all of the face regions in the image included among the extracted face regions, and the like). In this case, the extraction of the face region and the computation of the face region density may be carried out plural times in accordance with the respective image processings. In the present embodiment, the degree of overlapping x may be used as the reliability (probability) of a face candidate region being a face region. As described above, by changing at least one of the standard for setting the weight points for the respective face candidate regions, the standard for face region judgement (the threshold value $TH_F$), and the standard for weighting the respective face candidate regions, the results required by respective image processings can respectively be obtained as the results of face region extraction and the results of face region density computation. Therefore, even in a case in which various types of image processings are carried out, there is no need repeatedly carry out the face candidate region extraction processing, which is extremely complex and requires much time, a number of times which is equal to the number of types of image processings, while changing the processing conditions in accordance with the plural types of image processings. The processing time required for face region extraction/density computation processing can be shortened, and an improvement in the performance of the image processing device 14 can be realized.

A case is described above in which computation of the processing conditions including the face region extraction/density computation processing is carried out by the auto set up engine 44 on the basis of prescan image data, and the actual image processing on the fine scan image data is carried out at the image processor 40. However, the present invention is not limited to the same. The computation of the processing conditions and the image processing under the computed processing conditions may be carried out in order for a single image data, or the computation of the processing conditions and the image processing under the computed processing conditions may be carried out as a series of processings at a single processing section.

Further, in the above description, face region extraction and face region density computation are both carried out on the basis of the weight points set for the respective face candidate regions. However, the present invention is not limited to the same, and it is possible to carry out only one of face region extraction and face region density computation on the basis of the set weight points.

Moreover, in the above description, the image data obtained by reading of an image recorded on a photographic film is used as the object of processing. However, the present invention is not limited to the same. Image data obtained by reading an image recorded on another recording material such as a sheet, or image data obtained by photographing by a digital camera, or image data generated by a computer may be used as the object of processing. Further, the present invention may be used in the determination of exposure conditions to be used at the time of exposing and recording a film image recorded on a photographic film onto a photographic printing paper by plane exposure.

Although a description has been given herein of a case in which a region corresponding to a face of a person in an image is used as the main portion, the present invention is not limited to the same. For example, the present invention is also applicable to a case in which, in the mass production of a part or an article, the state of the produced parts or articles being conveyed in order is photographed, an image illustrating the conveyed state is extracted from the photographing signal at a predetermined timing, and a region corresponding to the part or article is extracted from the extracted image as a region corresponding to a main portion. In this case, the extracted main portion region may be used to, for example, automatically inspect the manufactured product or good.

As described above, the image processing method of the first through the ninth aspects of the present invention comprises the steps of: on the basis of image data, extracting candidate regions which are assumed to correspond to main portions in an image represented by the image data; determining, for each of candidate regions which overlap with another candidate region among the extracted candidate regions, a degree of overlapping with another candidate region; and for an extracted candidate region, evaluating the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases. Thus, an excellent effect is achieved in that effects due to mistakes in the extraction of regions assumed to correspond to main portions within an image can be mitigated.

In the second aspect of the present invention, in the first aspect, at least one of a value in which a distance between a pair of overlapping candidate regions is normalized by using respective sizes of the pair of overlapping candidate regions as a standard; a value in which a surface area of an overlapped region of a pair of overlapping candidate regions is normalized by using respective sizes of the pair of candidate regions as a standard; and a value in which a size along a predetermined direction of an overlapped region of a pair of overlapping candidate regions is normalized by using as a standard respective sizes along the predetermined direction of the pair of overlapping candidate regions, is used as the degree of overlapping. Therefore, in addition to the above effect, an effect is achieved in that the degree of overlapping of a candidate region can be accurately digitized regardless of the size of the candidate region.

In the third aspect of the present invention, in the first aspect, for an extracted candidate region, by comparing an evaluation value, which expresses the results of evaluating the probability of being a region corresponding to a main portion, with a threshold value, a candidate region having a high probability of being a region corresponding to a main portion is selected from among the extracted candidate regions. Therefore, in addition to the above effect, an effect is achieved in that a candidate region having a high probability of being a region corresponding to a main portion can be selected accurately by a simple process.

In the fourth aspect of the present invention, in the first aspect, a weight is applied, to an extracted candidate region or to a candidate region selected from among the extracted candidate regions, in accordance with an evaluation value which expresses the results of evaluating the probability of being a region corresponding to a main portion, and a weighted average of an image characteristic amount of the extracted candidate region or the selected candidate region is computed as an image characteristic amount of the main portion. Thus, in addition to the above effect, there is the effect that an image characteristic amount of a main portion can be determined accurately by a simple process.

In the fifth aspect of the present invention, in the first aspect, after evaluation, for an extracted candidate region, of the probability of being a region corresponding to a main portion, when carrying out, on the basis of the results of evaluation, a predetermined image processing which includes at least one of selecting a candidate region having a high probability of being a region corresponding to a main portion and weighting an extracted candidate region, the standard for evaluation is changed or the standard for the selection or the weighting is change in accordance with the type of the predetermined image processing. Therefore, in addition to the above effect, an effect is achieved in that appropriate processing results can always be obtained regardless of the type of the predetermined image processing.

In the sixth aspect of the present invention, in the fifth aspect, when said predetermined image processing is an image processing whose processing results are greatly affected when a candidate region is erroneously extracted or a candidate region is mis-evaluated, one of the following is carried out: the standard of evaluation of the probability of being a region corresponding to a main portion is changed so as to be made more strict; the standard for the selection is changed such that only a candidate region evaluated as having a high probability of being a region corresponding to a main portion is selected; and a standard for weighting is changed such that a weight for a candidate region evaluated as having a low probability of being a region corresponding to a main portion is relatively small. Thus, in addition to the above effect, there is the effect that the processing results of the predetermined processing can be prevented from being greatly affected even if a candidate region is erroneously extracted or a candidate region is mis-evaluated.

In the seventh aspect of the present invention, in the fifth aspect, when the predetermined image processing is an image processing whose processing results are only slightly affected even if a candidate region is erroneously extracted or a candidate region is mis-evaluated, one of the following is carried out: the standard of evaluation of the probability of being a region corresponding to a main portion is changed so as to be made less strict; the standard for the selection is changed such that a candidate region evaluated as having a low probability of being a region corresponding to a main portion is also selected; and a standard for weighting is changed such that a weight for a candidate region evaluated as having a low probability of being a region corresponding to a main portion is relatively large. Thus, in addition to the above effect, there is the effect that, when a candidate region is erroneously extracted or a candidate region is mis-evaluated, there is little effect on the processing results of the post-processings, and appropriate processing results can be obtained.

In the eighth aspect of the present invention, in the first aspect, for a candidate region whose density within the candidate region is higher than a first predetermined value or lower than a second predetermined value, the evaluation of the probability of being a region corresponding to a main portion is lowered, or the standard for selection at the time a candidate region having a high probability of being a region corresponding to a main portion is selected is made higher. Therefore, in addition to the above effect, an effect is achieved in that, even if a region whose density is extremely high or is extremely low is erroneously extracted as a candidate region, the processing results of the post-processings can be prevented from being inappropriate.

The tenth aspect of the present invention is a recording medium on which is recorded a program for executing at a computer a processing comprising: a first step of, on the basis of image data, extracting candidate regions which are assumed to correspond to main portions in an image represented by the image data; a second step of determining, for each of candidate regions which overlap with another candidate region among the extracted candidate regions, a degree of overlapping with another candidate region; and a third step of, for an extracted candidate region, evaluating the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases. Thus, an excellent effect can be achieved in that effects caused by mistakes in the extraction of a region assumed to correspond to a main portion within the image can be reduced.

What is claimed is:

1. An image processing method comprising the steps of:
    on the basis of image data, extracting candidate regions which are assumed to correspond to main portions in an image represented by the image data;
    determining, for each of candidate regions which overlap with another candidate region among the extracted candidate regions, a degree of overlapping with another candidate region; and
    for an extracted candidate region, evaluating the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases.

2. An image processing method according to claim 1, wherein at least one of
    a value in which a distance between a pair of overlapping candidate regions is normalized by using respective sizes of the pair of overlapping candidate regions as a standard;
    a value in which a surface area of an overlapped region of a pair of overlapping candidate regions is normalized by using respective sizes of the pair of candidate regions as a standard; and
    a value in which a size along a predetermined direction of an overlapped region of a pair of overlapping candidate regions is normalized by using as a standard respective sizes along the predetermined direction of the pair of overlapping candidate regions, is used as the degree of overlapping.

3. An image processing method according to claim 1, wherein, for an extracted candidate region, by comparing an evaluation value, which expresses the results of evaluating the probability of being a region corresponding to a main portion, with a threshold value, a candidate region having a high probability of being a region corresponding to a main portion is selected from among the extracted candidate regions.

4. An image processing method according to claim 1, wherein a weight is applied, to an extracted candidate region or to a candidate region selected from among the extracted candidate regions, in accordance with an evaluation value which expresses the results of evaluating the probability of being a region corresponding to a main portion, and a weighted average of an image characteristic amount of the extracted candidate region or the selected candidate region is computed as an image characteristic amount of the main portion.

5. An image processing method according to claim 1, wherein after evaluation, for an extracted candidate region, of the probability of being a region corresponding to a main portion, when carrying out, on the basis of the results of evaluation, a predetermined image processing which includes at least one of selecting a candidate region having a high probability of being a region corresponding to a main portion and weighting an extracted candidate region, the standard for evaluation is changed or the standard for the selection or the weighting is change in accordance with the type of the predetermined image processing.

6. An image processing method according to claim 5, wherein when said predetermined image processing is an image processing whose processing results are greatly affected when a candidate region is erroneously extracted or a candidate region is mis-evaluated, one of the following is carried out:

the standard of evaluation of the probability of being a region corresponding to a main portion is changed so as to be made more strict;

the standard for the selection is changed such that only a candidate region evaluated as having a high probability of being a region corresponding to a main portion is selected; and a standard for weighting is changed such that a weight for a candidate region evaluated as having a low probability of being a region corresponding to a main portion is relatively small.

7. An image processing method according to claim 5, wherein when the predetermined image processing is an image processing whose processing results are only slightly affected even if a candidate region is erroneously extracted or a candidate region is mis-evaluated, one of the following is carried out:

the standard of evaluation of the probability of being a region corresponding to a main portion is changed so as to be made less strict;

the standard for the selection is changed such that a candidate region evaluated as having a low probability of being a region corresponding to a main portion is also selected; and a standard for weighting is changed such that a weight for a candidate region evaluated as having a low probability of being a region corresponding to a main portion is relatively large.

8. An image processing method according to claim 1, wherein, for a candidate region whose density within the candidate region is higher than a first predetermined value or lower than a second predetermined value, the evaluation of the probability of being a region corresponding to a main portion is lowered, or the standard for selection at the time a candidate region having a high probability of being a region corresponding to a main portion is selected is made higher.

9. An image processing device comprising:

extracting means for, on the basis of image data, extracting candidate regions which are assumed to correspond to main portions in an image represented by the image data;

computing means for determining, for each of candidate regions which overlap with another candidate region among the extracted candidate regions, a degree of overlapping with another candidate region; and evaluating means for evaluating, for an extracted candidate region, the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases.

10. A recording medium on which is stored a program for executing at a computer a processing comprising:

a first step of, on the basis of image data, extracting candidate regions which are assumed to correspond to main portions in an image represented by the image data;

a second step of determining, for each of candidate regions which overlap with another candidate region among the extracted candidate regions, a degree of overlapping with another candidate region; and a third step of, for an extracted candidate region, evaluating the probability of being a region corresponding to a main portion in the image, in such a manner that, for a candidate region overlapping with another candidate region, an evaluation of the probability of being a region corresponding to a main portion within the image is higher than said evaluation for a candidate region not overlapping with another candidate region, and becomes higher as a degree of overlapping with another candidate region increases.

* * * * *